United States Patent [19]

Keenan

[11] 4,049,988
[45] Sept. 20, 1977

[54] TUNGSTEN HALOGEN LAMP

[75] Inventor: James P. Keenan, Reading, Mass.

[73] Assignee: GTE Sylvania Incorporated, Danvers, Mass.

[21] Appl. No.: 676,840

[22] Filed: Apr. 14, 1976

[51] Int. Cl.² .............................................. H01K 1/50
[52] U.S. Cl. ..................................... 313/222; 313/226
[58] Field of Search ........................ 313/222, 224, 226

[56] References Cited

U.S. PATENT DOCUMENTS

| 1,655,488 | 1/1928 | Wolff et al. ...................... 313/224 X |
| 2,219,890 | 10/1940 | Freitag et al. .................... 313/226 X |
| 3,091,718 | 5/1963 | Shurgan ............................ 313/224 X |
| 3,431,448 | 3/1969 | English ............................. 313/222 X |
| 3,974,413 | 8/1976 | Craig .................................... 313/222 |

Primary Examiner—Palmer C. Demeo
Attorney, Agent, or Firm—James Theodosopoulos

[57] ABSTRACT

Helium is added as a component of the gaseous filling of a tungsten halogen lamp in order to prevent deposits from forming on the walls of the lamp envelope.

3 Claims, 1 Drawing Figure

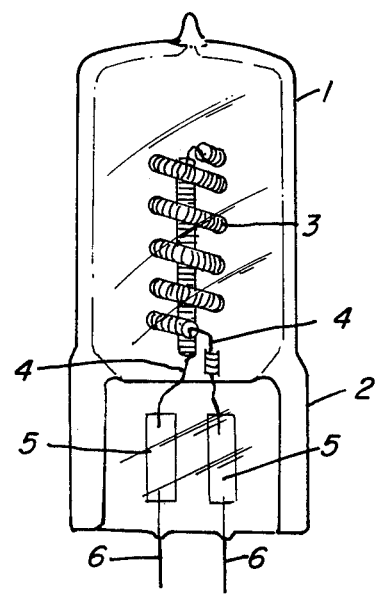

TUNGSTEN HALOGEN LAMP

THE INVENTION

This invention concerns tungsten halogen lamps. Such lamps comprise a glass — usually silica — envelope, a coiled tungsten filament and a filling which includes a halogen to provide the well-known regenerative cycle.

In some cases, tungsten halogen lamps are of such a construction or operate in such a mode that the envelope wall does not get hot enough to maintain the regenerative cycle. Such a condition is discussed in U.S. Pat. No. 3,831,053 which discloses one solution therefor, namely, the addition of chlorine and hydrogen to the fill gas. This invention is concerned with another solution to the problem which uses a less reactive gas.

A tungsten halogen lamp in accordance with this invention includes helium as a component of the gaseous filling. Since helium is a better heat conductor than the gases generally used, usually argon and/or nitrogen, the envelope wall temperature can be increased sufficiently to maintain the regenerative cycle. This improvement occurs at the slight expense of lamp efficiency since the helium also increases heat loss from the filament.

The single FIGURE in the drawing is an elevational view of a tungsten halogen lamp in accordance with this invention.

The lamp has a silica glass envelope 1 sealed at one end by means of press seal 2. Disposed within envelope 1 is a coiled tungsten filament 3 the ends of which are connected to lead-in wires 4 which, in turn, are connected to ribbon 5, embedded in press seal 2, and thence to external lead-in wires 6.

Envelope 1 contained a gaseous filling of a halogen or halogen compound, nitrogen and argon.

In one example of a single ended lamp having a T6 envelope and operated at 600 watts, 80 volts on a duty cycle of 18 seconds on, 18 seconds off, where the filling consisted of 0.4% hydrogen bromide and the balance nitrogen, a yellow deposit gradually formed on the envelope wall. Under the same conditions, but where helium was substituted for 20% of nitrogen (volume basis), no deposit formed. The fill pressure was the same in both cases, about 3 atmospheres.

In another case of a double ended lamp having a T2½ envelope twelve inches long and a segmented coil filament and which was operated at 1000 watts, 115 volts on a duty cycle of 2 seconds on, 20 seconds off, and where the fill consisted of 0.4% hydrogen chloride and the balance argon, a yellow deposit gradually formed on the envelope wall over a period of 45,000 cycles. Under the same conditions, where helium was substituted for 50% of the argon (volume basis), no deposit formed over the same cycling period.

In order to determine the quantitative effect that helium had on envelope wall temperature, the above T2½ lamps were operated at steady state conditions, and said temperature was measured at 1½ inch intervals along the length of the envelope. The respective temperatures for the argon filled lamp were 630°, <200°, 590°, <200°, 530°, <200° and 625° C. The corresponding temperatures for the 50% argon — 50% helium lamp were 1180°, 240°, 1080°, 240°, 1100°, 240°, and 1240° C. Thus the argon-helium mixture increased the envelope temperature about 490° to 615° C at the envelope wall encircling the incandescent portions of the filament and at least 40° C at the envelope wall encircling the shorted out portions of the filament.

I claim:

1. In a tungsten halogen lamp of the type where normal lamp operation does not permit attainment of a sufficiently high envelope wall temperature to prevent depositis from forming on the envelope walls, the improvement which comprises providing sufficient helium as a component of the lamp gaseous filling to prevent said deposits from forming, said helium being 20 to 50 volume percent of the total gaseous filling.

2. The lamp of claim 1 wherein said gaseous filling consists mainly of nitrogen and helium.

3. The lamp of claim 1 wherein said gaseous filling consists mainly of argon and helium.

* * * * *